US009762070B2

(12) United States Patent
Bae et al.

(10) Patent No.: US 9,762,070 B2
(45) Date of Patent: Sep. 12, 2017

(54) METHOD AND APPARATUS FOR MANAGING LIFE OF BATTERY BANK

(71) Applicants: QIT CO., LTD., Suwon-si, Gyeonggi-do (KR); Research & Business Foundation SUNGKYUNKWAN UNIVERSITY, Suwon-si, Gyeonggi-do (KR)

(72) Inventors: Joung Hwan Bae, Yongin-si (KR); Bo Hyun Baik, Seongnam-si (KR); Sung Yong Kim, Osan-si (KR); Chung Yuen Won, Gwacheon-si (KR)

(73) Assignees: QIT Co., Ltd., Suwon-si, Gyeonggi-do (KR); Research & Business Foundation Sungkyunkwan University, Suwon-si, Gyeonggi-do (KR)

( * ) Notice: Subject to any disclaimer, the term of this patent is extended or adjusted under 35 U.S.C. 154(b) by 172 days.

(21) Appl. No.: 14/827,840

(22) Filed: Aug. 17, 2015

(65) Prior Publication Data
US 2016/0056644 A1 Feb. 25, 2016

(30) Foreign Application Priority Data
Aug. 19, 2014 (KR) .................. 10-2014-0107763

(51) Int. Cl.
*H02J 7/00* (2006.01)

(52) U.S. Cl.
CPC .......... *H02J 7/0021* (2013.01); *H02J 7/0013* (2013.01); *H02J 7/0068* (2013.01)

(58) Field of Classification Search
CPC ........ H02J 7/0063; H02J 7/0013; H02J 7/007; H02J 7/0026; H02J 7/0021; H01M 10/44; H01M 10/425; H01M 10/441; H01M 10/443; H01M 10/482; H01M 2220/20; H01M 2010/4271; B60L 2230/12; H02P 27/04
See application file for complete search history.

(56) References Cited

U.S. PATENT DOCUMENTS 9,435,866 B2 * 9/2016 Takahashi .......... G01R 31/3658
2010/0250162 A1 * 9/2010 White ................ G01R 31/3679
702/63

(Continued)

FOREIGN PATENT DOCUMENTS

| JP | 2011-064571 A | 3/2011 |
| KR | 20-0413982 Y1 | 4/2006 |
| KR | 10-1253715 B1 | 4/2013 |

(Continued)

*Primary Examiner* — Edward Tso
*Assistant Examiner* — Sailesh Thapa
(74) *Attorney, Agent, or Firm* — Novick, Kim & Lee, PLLC; Sang Ho Lee; Jae Youn Kim (57) ABSTRACT

In a method of efficiently managing and extending life of a battery bank, it is identified whether lifespan characteristic value of a battery bank unit reaches a predetermined threshold value of lifespan extension, by monitoring a lifespan characteristic value of an individual battery bank unit. While the other battery bank units normally supply power, a high-frequency electric pulse is applied to an identified battery bank unit through a DC/DC converter. Thus, materials preventing an electrochemical reaction accumulated on an electrode are removed.

12 Claims, 8 Drawing Sheets

(56) References Cited

U.S. PATENT DOCUMENTS

2013/0141053 A1* 6/2013 Kondo .............. H01M 10/4242
                                                    320/141
2014/0167657 A1* 6/2014 Nishikawa .......... H01M 10/441
                                                    318/139

FOREIGN PATENT DOCUMENTS

KR        10-1331924 B1   11/2013
KR        10-1389129 B1    4/2014

* cited by examiner

BATTERY OUTPUT VOLTAGE AT CONSTANT DISCHARGE CURRENT

FIG. 5

METHOD AND APPARATUS FOR MANAGING LIFE OF BATTERY BANK

CROSS-REFERENCE TO RELATED APPLICATION

This application claims the benefit of Korean Patent Application No. 10-2014-0107763, filed on Aug. 19, 2014, in the Korean Intellectual Property Office, the disclosure of which is incorporated herein in its entirety by reference.

BACKGROUND

1. Field

One or more exemplary embodiments relate to a method and apparatus for efficiently managing life of a battery bank by monitoring life of a battery bank unit online

2. Description of the Related Art

A battery bank unit is a unit of a battery bank that is a large-scale battery assembly. A single battery may form a battery bank unit or a plurality of batteries that are serially or parallelly connected to each other may form a battery bank unit. These battery bank units make a large-scale battery bank.

A battery bank, which is an assembly of battery bank units, has been applied to various fields such as an internet data center (IDC) or an uninterruptable power supply (UPS).

Battery manufacturers have recommended using a plurality of batteries manufactured from the same manufacture lot, that is, a certain period and a certain place, for one battery bank system and banned a mixed use of batteries manufactured from different lots in the same battery bank. This is because batteries manufactured under the same conditions may differ in their life due to a difference in a manufacture time. For example, one battery manufactured several months earlier than the other battery may have a shorter life than the other battery. The whole life of a battery bank is mainly determined by a battery that is manufactured earlier than the other batteries. Accordingly, when the life of an earlier manufactured battery is over, a battery bank may be disposed of even when a later manufactured battery still works.

As such, when the life of each unit of a battery bank is not properly monitored, the whole life of a battery bank is determined according to the life of the weakest battery bank unit. In this case, it is an industrial practice to dispose of the entire battery bank and replace it with a new battery bank even when most rechargeable other batteries are still usable. Korean Patent Application No. 10-2013-0068644 entitled "Method and Apparatus for Monitoring Life of Battery Bank Online" discloses an invention in which a battery bank unit is individually removable and life of a battery bank unit may be monitored online, thereby efficiently using a battery bank. According to the invention, online monitoring of life of a battery bank is possible. If the life of a battery bank unit having a shorter life than the other bank unit can be rather extended through monitoring, use efficiency of a battery bank may be quite improved.

Thus, a method and apparatus for managing life of a battery bank unit which may extend the life of a battery bank at its maximum and also remove user's inconvenience of separating a battery bank unit is needed.

SUMMARY

One or more exemplary embodiments include a method of managing life of a battery bank unit which may increase efficiency in use of a battery bank by efficiently monitoring the life of a battery bank that provides a large capacity of power and selectively extending life of a battery that needs extension of life.

One or more exemplary embodiments include an apparatus for managing life of a battery bank unit which may increase efficiency in use of a battery bank by efficiently monitoring the life of a battery bank that provides a large capacity of power and selectively extending life of a battery that needs extension of life.

Additional aspects will be set forth in part in the description which follows and, in part, will be apparent from the description, or may be learned by practice of the presented exemplary embodiments.

According to one or more exemplary embodiments, a method of managing life of a battery bank includes determining a threshold value of lifespan extension with respect to a lifespan characteristic value of a battery bank unit, a) selecting one of N-number of battery bank units, charging and discharging a selected battery bank unit through a DC/DC converter, and determining an initial lifespan characteristic value of the selected battery bank unit, b) allowing at least some of (N−1) number of battery bank units other than the selected battery bank unit to perform a normal operation of supplying power to a system during the determining the initial life characteristic value of the selected battery bank unit, repeating the operations a) and b) until the initial lifespan characteristic value of each of the N-number of battery bank units is determined, selecting one of the N-number of battery bank units, charging and discharging the selected battery bank unit through the DC/DC converter, identifying the battery bank unit when the lifespan characteristic value of the selected battery bank unit reaches a threshold value of lifespan extension, and applying an electric pulse to the identified battery bank unit through the DC/DC converter.

The method may further include determining a life threshold value with respect to a lifespan characteristic value of the battery bank unit, in which the threshold value of lifespan extension is greater than the life threshold value.

The life threshold value may be determined by a predetermined time value that is less than the initial lifespan characteristic value.

The initial lifespan characteristic value may be determined by a time to reach a predetermined voltage or full discharge when each of the N-number of battery bank units is discharged.

The initial lifespan characteristic value may be determined by a total energy amount discharged until a time to be fully discharged or a time to reach a predetermined voltage when each of the N-number of battery bank units is discharged.

The identifying of the battery bank unit may include selecting one of the N-number of battery bank units, fully charging and fully discharging the selected battery bank unit through the DC/DC converter, and determining whether the lifespan characteristic value of the selected battery bank unit reaches the threshold value of lifespan extension.

The applying of an electric pulse through the DC/DC converter may include applying through the DC/DC converter a continuous electric pulse string.

In the applying of an electric pulse through the DC/DC converter, the DC/DC converter may apply an electric pulse string at a variable frequency.

The variable frequency may include a mechanical resonance frequency of an electrode constituting a battery bank unit to which the electric pulse is applied.

According to one or more exemplary embodiments, an apparatus for managing life of a battery bank includes N-number of battery bank units, N-number of DC/DC converters respectively connected to the N-number of battery bank units and charging and discharging a battery bank unit, and a master controller configured to a) select one of the N-number of battery bank units, control charging and discharging the selected battery bank unit, and determine an initial lifespan characteristic value of the selected battery bank unit, b) allow at least some of (N−1) number of battery bank units other than the selected battery bank unit to perform a normal operation of supplying power to a system while an initial lifespan characteristic value of the selected battery bank unit is determined, and repeat the operations a) and b) until the initial lifespan characteristic value of each of the N-number of battery bank units is determined in sequence, in which the master controller is configured to determine a threshold value of lifespan extension with respect to lifespan characteristic values of the N-number of battery bank units, select one battery bank unit among the N-number of battery bank units, and identify the battery bank unit whose lifespan characteristic value reaches the threshold value of lifespan extension when the DC/DC converter connected to the selected battery bank unit charges and discharges the selected battery bank unit, and the DC/DC converter applies electric pulses to the identified battery bank unit.

The master controller may be further configured to determine a life threshold value with respect to a lifespan characteristic value of the battery bank unit, and the threshold value of lifespan extension may be greater than the life threshold value.

The life threshold value may be determined by a predetermined time value that is less than the initial lifespan characteristic value.

The initial lifespan characteristic value may be determined by a time to reach a predetermined voltage or full discharge when each of the N-number of battery bank units is discharged while maintaining a constant current output.

The initial lifespan characteristic value may be determined by a total energy amount discharged until a time to be fully discharged or a time to reach a predetermined voltage when each of the N-number of battery bank units is discharged while maintaining a constant current output.

The master controller may be further configured to identify a battery bank unit whose lifespan characteristic value reaches the threshold value of lifespan extension by selecting one of the N-number of battery bank units and fully charging and fully discharging the selected battery bank unit through the DC/DC converter and determining whether the lifespan characteristic value of the selected battery bank unit reaches the threshold value of lifespan extension.

According to one or more exemplary embodiments, an apparatus for managing life of a battery bank includes N-number of battery bank units, a switch connected to each of the N-number of battery bank units, a DC/DC converter discharging the N-number of battery bank units, a changer connecting a battery bank unit selected to discharge the DC/DC converter and the DC/DC converter via the switch, and a master controller configured to a) select one of the N-number of battery bank units, control charging and discharging the selected battery bank unit, and determine an initial lifespan characteristic value of the selected battery bank unit, b) allow at least some of (N−1) number of battery bank units other than the selected battery bank unit to perform a normal operation of supplying power to a system while the initial lifespan characteristic value of the selected battery bank unit is determined, and repeat the operations a) and b) until the initial lifespan characteristic value of each of the N-number of battery bank units is determined in sequence, in which the master controller is further configured to determine a threshold value of lifespan extension with respect to the lifespan characteristic values of the N-number of battery bank units, select one battery bank unit among the N-number of battery bank units, and select the battery bank unit whose lifespan characteristic value reaches the threshold value of lifespan extension when the selected battery bank unit is charged and discharged by the DC/DC converter, and the DC/DC converter applies an electric pulse to the identified battery bank unit.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Terms used in the present specification are used for explaining a specific exemplary embodiment, not for limiting the present inventive concept. Thus, an expression used in a singular form in the present specification also includes the expression in its plural form unless clearly specified otherwise in context. As used herein, the term "and/or" includes any and all combinations of one or more of the associated listed items. Expressions such as "at least one of," when preceding a list of elements, modify the entire list of elements and do not modify the individual elements of the list.

A battery bank unit is a part of a battery bank and a removable unit for convenience of explanation of an exemplary embodiment. A battery bank unit may be a single battery or an assembly in which a plurality of batteries are electrically serially and/or parallelly connected to each other. Also, each battery bank unit that is an element of a battery bank has a similar energy capacity and a substantially similar output voltage.

A battery bank that supplies a large capacity power may use a lead-acid battery. A battery is formed of a positive plate ($PbO_2$), a negative plate (Pb), and an electrolyte ($H_2SO_4$) and chemical energy is converted to electric energy through electrochemical reaction so that power is supplied through the positive plate. When charging and discharging are repeated in a battery, sulfate ($SO_4$) is accumulated on an electrode. Sulfate reduces a chemical reaction area of an electrode, thereby lowering charging efficiency of a battery. The sulfate once attached to an electrode is hardly separated therefrom, which continuously affects life of a battery. Finally, the sulfate is fixed to an electrode and thus the battery is disposed of. Accordingly, the battery life may be extended by intermittently removing the sulfate attaching to the battery electrode. It is convenient and efficient to automatically remove sulfate without disassembling the battery, rather than manually detaching a battery unit to remove the sulfate.

An example of removing sulfate is to apply a high-frequency electric pulse to an electrode. In other words, a user may remove sulfate attached to a surface of an electrode by applying a high-frequency electric pulse (current pulse) to the electrode by using a direct current/direct current (DC/DC) converter. A DC/DC converter may generate a DC pulse string of about 500 Hz to several tens of thousands of hertz. A DC pulse string may generate ultra-high frequency vibrations in a battery electrode and thus sulfate may be removed by the vibrations. When the sulfate is removed from the electrode, an area of the electrode contacting electrolyte may be increased and the battery life may be extended. The applied high-frequency current pulse is efficient for removing sulfate as the high-frequency current pulse is closer to a mechanical resonance frequency of an electrode of a battery bank unit.

In the above description, a lead-acid battery in which a sulfuric acid solution is used as an electrolyte is described as an example. However, the same method may be applied to a case in which a different metal material is used as a battery electrode and a different chemical solution is used as an electrolyte.

Figure 1:
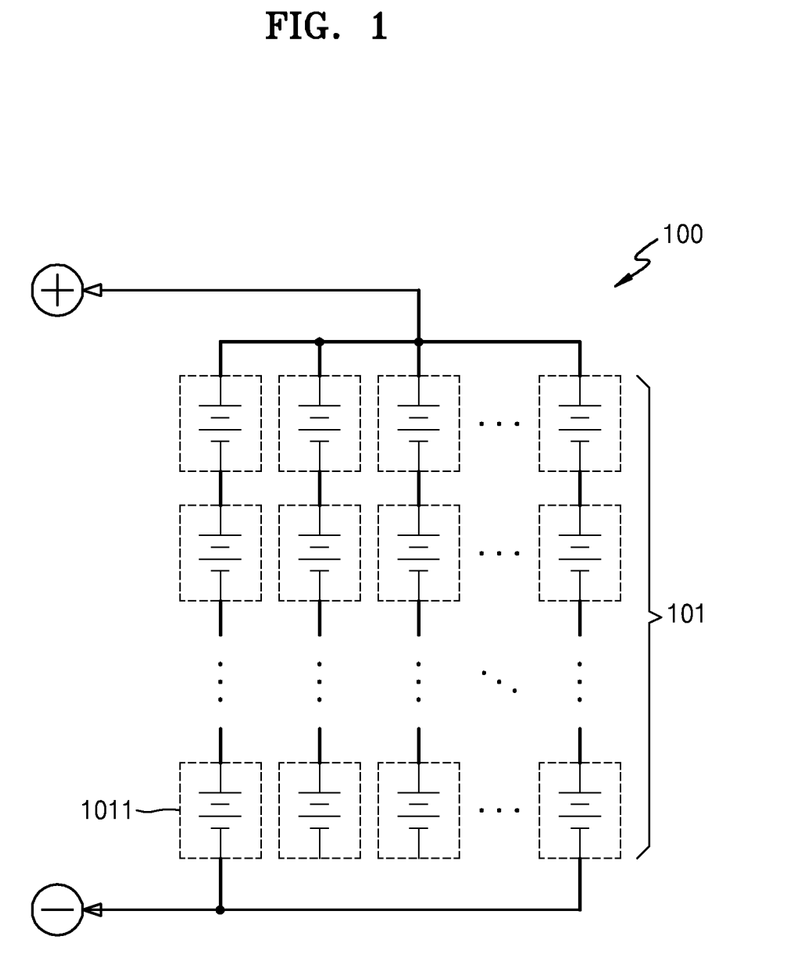
FIG. 1 illustrates electric connection of a battery bank including a battery bank unit.

FIG. 1 illustrates electric connection of a battery bank 100 including a battery bank unit.

The battery bank 100 may include a plurality of battery bank units 101. In general, the battery bank 100 connects the battery bank units 101 in parallel in order to increase an overall capacity. The voltage of the battery bank 100 is generally the same as the voltage of each of the battery bank units 101. However, when the battery bank units 101 are connected in series, the sum of the voltages of the battery bank units 101 may be an output voltage of the battery bank 100.

Assuming that one battery bank unit 101 outputs, for example, 200 V, and the voltage of an individual battery 1011 to be connected is 5 V, a total of twenty individual batteries 1011 are connected in series to output a voltage of 200 V. Also, in order for the battery bank 100 to continuously supply power, the battery bank units 101, each including twenty individual batteries 1011 that are connected in series, are connected in parallel.

In a simple method of monitoring life of a battery bank, to detach the battery bank unit 101, a user disconnects entire electric connection of the battery bank 100 that supplies power to a system, and detaches the battery bank unit 101 from the battery bank 100. Next, the user discharges the detached battery bank unit 101 after charging the same, and checks how long the detached battery bank unit 101 maintains a predetermined discharge level. Then, the user expects the remaining life of the battery bank unit 101 according to a result of the checking and reinstalls the detached battery bank unit 101 in the battery bank 100. According to the method, however, the user may not be able to check the remaining life of the battery bank unit in real time. Accordingly, it is more difficult for the user to expect how long the battery bank 100 is used. Moreover, it is inefficient to give vibrations to an electrode through a DC/DC converter in order to remove a material such as sulfate attached to the electrode, in spite that the battery life is long enough.

As such, since the user may not be able to monitor in real time life of an individual battery bank unit constituting the battery bank, the user generally replace the entire battery bank according to a battery bank unit having a short life period simply from the user's prior experiences. If the battery bank includes battery bank units that are sufficiently usable, such a method is inefficient in terms of costs. Accordingly, if the system automatically takes an action to give vibrations to an electrode to extend life by identifying a battery bank unit having a short life period among the battery bank units, the life period of the entire battery bank may be extended. In this case, if the system automatically monitors a life period without having to manually detach an individual battery unit of the battery bank, the life of the battery bank unit may be extended and thus system efficiency may be greatly improved.

Figure 2:
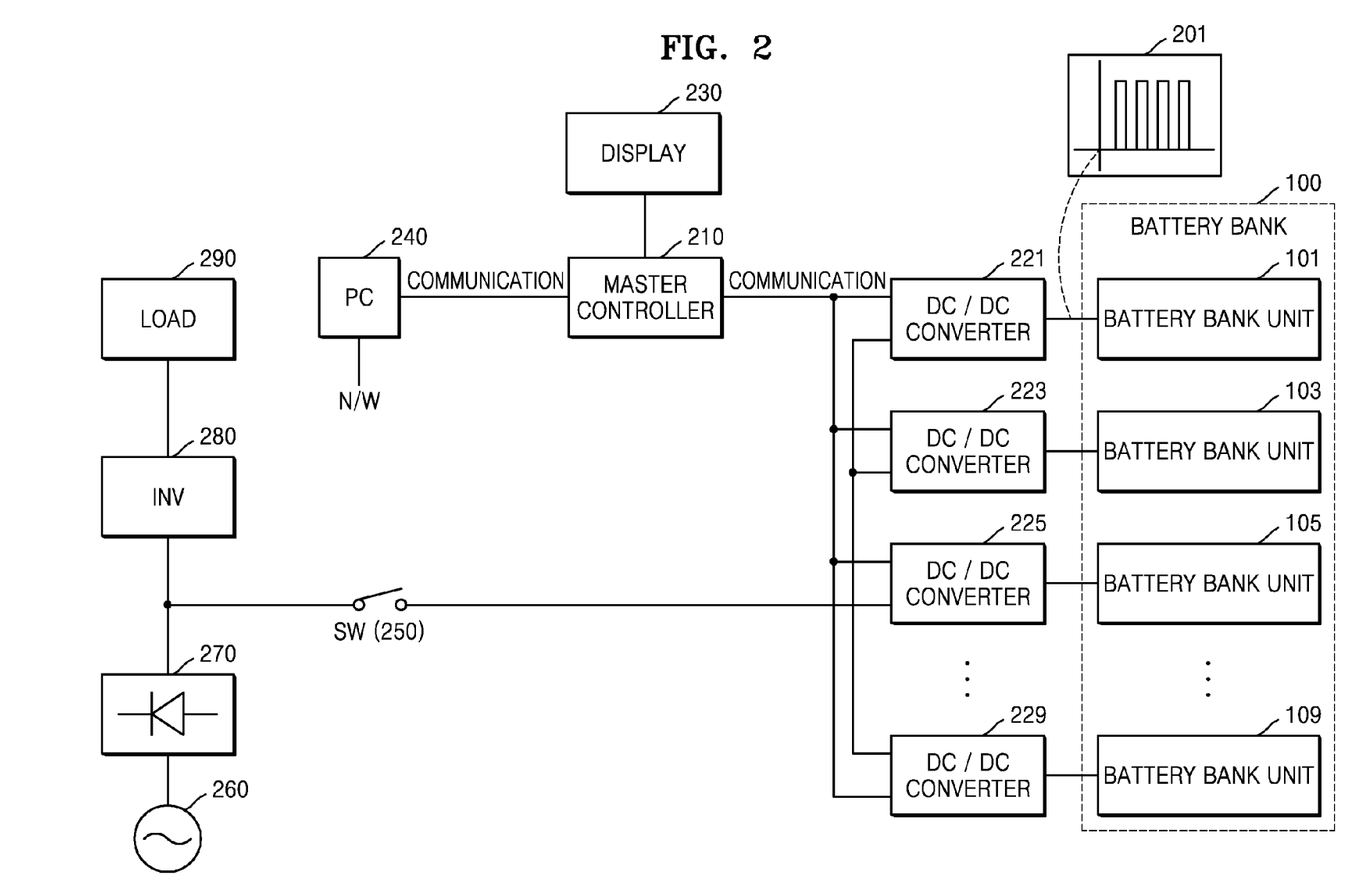
FIG. 2 is a block diagram of an overall system for efficiently managing life of a battery bank, according to an exemplary embodiment.

FIG. 2 is a block diagram of an overall system for efficiently managing life of a battery bank, according to an exemplary embodiment.

According to the present exemplary embodiment, when a battery bank is installed in a system, the maximum energy storage capacity is detected for each battery bank unit without separately detaching the battery bank unit, and a result of the detection is stored as data. The system measures online a degree of a decrease in the energy storage of each battery bank unit according to the passage of time and provides information about the remaining life to a user.

Referring to FIG. 2 the user may give a command to the entire system and monitor a state of the system through a personal computer (PC) 240. When a user command is input through the PC 240, a master controller 210 controls the overall system operation. The master controller 210 controls switching of DC/DC converters 221, 223, 225, and 229 respectively connected to battery bank units 101, 103, 105, and 109, via communications. In other words, the master controller 210 may provide a gate signal corresponding to a voltage command and a current command to the DC/DC converters 221, 223, 225, and 229 via communications. In this case, the communications may be a communication protocol such as RS-485 that is capable of multi-dropping. In addition to the RS-485, any communication protocol capable of multi-dropping may be employed.

The battery bank 100 includes the plurality of battery bank units 101, 103, 105, and 109. For convenience of explanation, it is assumed that the number of battery bank units included in the battery bank 100 of FIG. 2 is one hundred and one (101).

In an exemplary embodiment, when a voltage between opposite ends of one battery bank unit is 200 V, the battery bank 100 may output a voltage of 200 V assuming that the battery bank units are connected in parallel. However, it is assumed in the present exemplary embodiment that at least one of the battery bank units is in a life management state. Accordingly, while one hundred (100) battery bank units actually contribute to the output of the battery bank, one (1) battery bank unit is separately controlled by a DC/DC converter 221 to manage life of the one battery bank unit.

It is assumed that the master controller 210 selects one of the battery bank units of the battery bank 100, that is, the battery bank unit 101, for convenience of explanation. The master controller 210 fully charges and discharges the battery bank unit 101 through the DC/DC converter 221 and determines an initial lifespan characteristic value of the selected battery bank unit 101.

The initial lifespan characteristic value may be determined by a time taken when the battery bank unit 101 reaches a predetermined voltage after being discharged with a constant current. For example, when the battery bank unit is discharged with a constant current of 50 A through the DC/DC converter 221, a time taken when the output voltage of a battery bank unit drops from 200 V to 190 V may be set to be an initial lifespan characteristic value.

In another exemplary embodiment, the initial lifespan characteristic value is determined by a total amount of discharge energy. In other words, a time from when a battery bank unit is fully charged to when the battery bank unit is fully discharged is measured. The DC/DC converter makes a battery bank unit output a certain value of current and a time taken until the battery bank unit is fully discharged is measured and set to be the initial lifespan characteristic value.

The complete discharge may signify that electric charges are fully removed from the battery bank unit, or that an output voltage of a battery bank unit is dropped to a predetermined voltage that is set by a user. A voltage at the complete discharge is generally referred to as a final discharge voltage.

The master controller 210 measures the initial lifespan characteristic value by a method of fully charging and fully discharging all battery bank units in sequence and stores a measured value in a memory (not shown) in the master controller 210 or a memory (not shown) in the system. When the initial lifespan characteristic value of one battery bank unit is measured, the other battery bank units perform a normal operation of supplying power to the system so that battery life may be monitored without having to halt the system. Accordingly, to this end, the total number of the battery bank units according to the present exemplary embodiment is greater, by at least one, than the number of battery bank units required by the system.

The life threshold value is previously set according to the specification of the battery bank unit. For example, when the initial lifespan characteristic value, as a total discharge energy amount, is a time taken until the complete discharge while maintaining a constant output current of 50 A. The life threshold value may be less than the initial lifespan characteristic value and a "time length during which the battery bank unit is recognized to perform a normal operation", which is selected by a user may be selected to be the life threshold value. The initial lifespan characteristic value and the life threshold value are described with reference to FIGS. 4A to 4C.

Figure 4A:
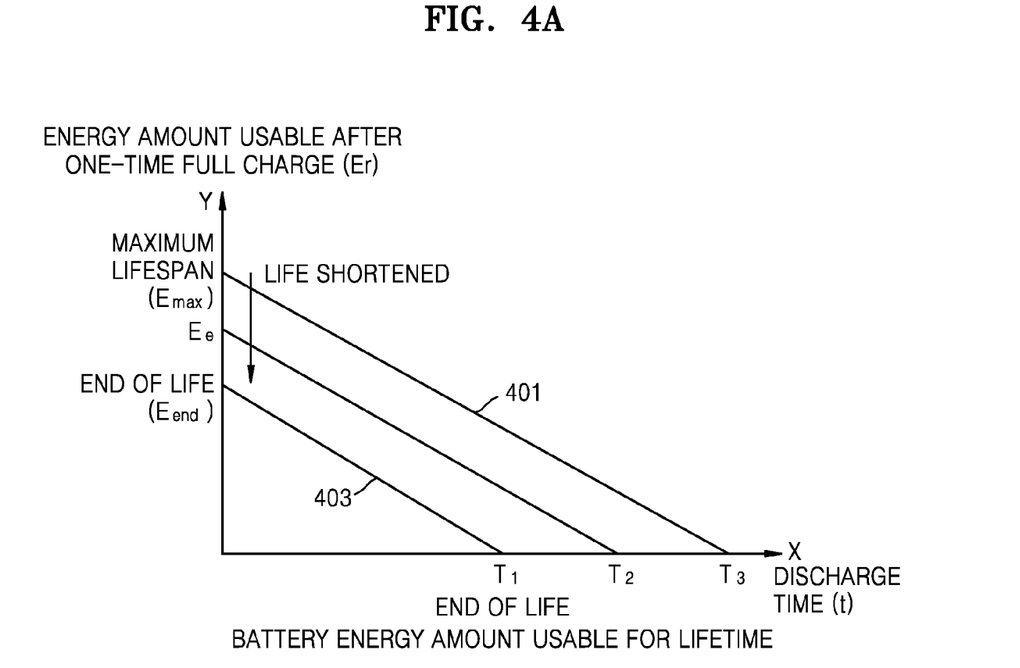
FIGS. 4A to 4C are graphs showing a relation among an initial lifespan characteristic value, a threshold value of lifespan extension, and a life threshold value, according to an exemplary embodiment.
Figure 4B:
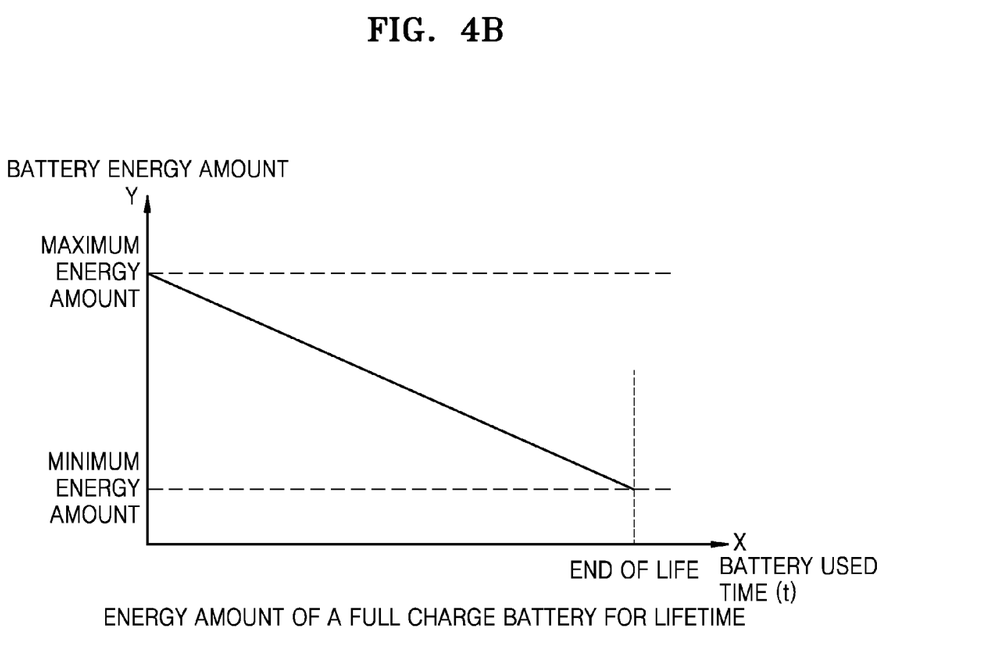
Figure 4C:
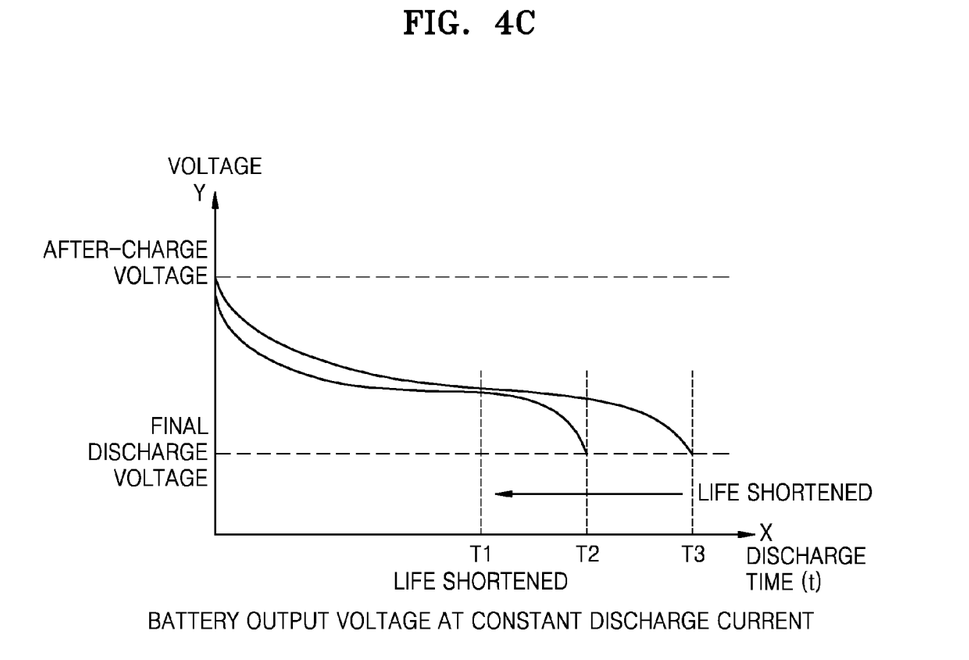

FIGS. 4A to 4C are graphs showing a relation among an initial lifespan characteristic value, a threshold value of lifespan extension, and a life threshold value, according to an exemplary embodiment.

First, FIG. 4A is a graph showing a usable energy amount when a battery bank unit is charged once, compared to a discharge time. In FIG. 4A, the Y axis denotes an energy amount usable after one-time full charge (Er) of a battery bank unit and the X axis denotes a discharge time of a battery bank unit.

A line 401 denotes an initial state of a battery bank unit in which the battery bank unit has the maximum lifespan and the longest discharge time T3 is required. In this state, the per-hour discharged energy may be uniform.

As the use of a battery bank unit increases, the life of the battery bank unit is shortened and thus the energy amount usable after one-time full charge Er moves from an initial maximum life value Emax to an end-of-life value Eend. As the life of a battery bank unit decreases, the line 401 is gradually moved toward a line 403 and the discharge time is gradually decreased from T3 to T1.

According to the graph of FIG. 4A, the energy amount supplied by a battery bank unit is calculated by multiplying an output voltage, an output current, and an operation duration of the battery bank unit. However, if the output current value is constant, the energy amount may be simply calculated with the output voltage and the operation duration. When the battery bank unit is fully charged, remaining energy at a time point when t=0 at which discharge is not performed is in the maximum charge energy state (Eend≤Er≤Emax). When a battery bank is discharged by the DC/DC converter at a constant current, the energy amount usable after one-time full charge is gradually decreased. Furthermore, a time taken until a battery bank unit is fully discharged after the initial full charge is t=T (T1≤T≤T3). Accordingly, an initial lifespan characteristic value is T3. For convenience of explanation, the battery bank unit has a lifespan characteristic value which is T3.

When the user would like to select an energy value, not a time value, as a lifespan characteristic value, an area, that is, a total discharged energy amount, of a triangle formed by Er, t, and the origin in FIG. 4A may be determined to be the lifespan characteristic value.

As the use of a battery bank unit increases, the energy amount usable after one-time full charge decreases and the time point when the battery bank unit is fully discharged on the same conditions as those when the initial lifespan characteristic value is measured is gradually decreased from T3 to T2 and T1. In other words, as time passes, the lifespan characteristic value is changed in an order that T3→T2→T1. When the lifespan characteristic value of a particular battery bank unit is equal to or less than T1, the user determines that the life of the battery bank unit reaches a limit and may set the life threshold value to T1. Alternatively, the user may set the area of a triangle formed by Eend, T1, and the origin to be the life threshold value. When the area of a triangle that is the lifespan characteristic value reaches the area of a triangle formed by Eend, T1, and the origin, the master controller 210 determines that the life of the battery bank unit is over.

In order to efficiently manage the life of a battery, a value between the initial lifespan characteristic value and the life threshold value is set to be a threshold value of lifespan extension. When the life property of a battery reaches the threshold value of lifespan extension, the system automatically takes an action to remove a material of an electrolyte component attached on an electrode, for example, sulfate for a lead-acid battery using a sulfuric acid solution as an electrolyte, by applying a pulse to the battery electrode through the DC/DC converter. The threshold value of lifespan extension is not theoretically determined, but is experimentally determined according to the convenience of a user. For example, in the case of FIG. 4A, T2 that is an intermediate value between T3 and T1 may be selected as the threshold value of lifespan extension. Alternatively, when the lifespan characteristic value is a total discharge energy amount, a life extension action may be taken when the total discharge energy amount reaches an area of a triangle formed by Ee, the origin, and T2. According to the life extension action, a high-frequency current pulse or high-frequency electric pulse is applied to an electrode and thus performance of a battery is improved. In other words, the lifespan characteristic value located at T2 is moved toward T3. Alternatively, the total discharge energy amount formed by Ee, the origin, and T2 is moved toward a triangle formed by Emax, the origin, and T3.

When the battery is frequently used, the lifespan characteristic value may not be improved further at T2. In this state, the user may set a secondary threshold value of lifespan extension to be less. The secondary threshold value of lifespan extension may be a point between T1 and T2. In this manner, the user may take a secondary action to extend life of a battery bank unit by setting the secondary threshold value of lifespan extension. In the same manner, the user may take a tertiary action to continuously extend the life of a battery bank unit by setting a tertiary threshold value of lifespan extension, thereby managing the lifespan of a battery bank unit.

In another example embodiment, when the initial lifespan characteristic value is set, the life threshold value may be determined to be a certain ratio of the set initial lifespan characteristic value. In other words, when the lifespan characteristic value reaches, for example, 70% of the initial lifespan characteristic value according to the experience of use of a battery bank unit, the life of the battery bank unit is regarded to be over and the life threshold value may be determined. The user may differently set the above percentage according to the type of a battery or a system operation condition. In this case, the threshold value of lifespan extension may be arbitrarily set to a certain value that is great than the life threshold value and less than the initial lifespan characteristic value. For example, the threshold value of lifespan extension may be set to 80% of the initial lifespan characteristic value. Alternatively, the threshold value of lifespan extension may be set to 110% of the life threshold value.

FIG. 4B is a graph showing the maximum energy conservation amount of a battery bank unit according to a passage of time. Referring to FIG. 4B, the Y axis denotes a battery energy amount and the X axis denotes a battery use time. When time passes while using a battery bank unit, a graph gradually moves toward a life end point on the X axis. As the battery use time is gradually accumulated and increased, a battery energy amount, that is, an amount of energy conserved in a battery bank unit, is gradually decreased. When one battery bank unit reaches the life end point at a certain point as time passes, the energy amount to be conserved becomes the minimum energy amount and the battery bank unit is inappropriate to be used further and is replaced.

FIG. 4C is a graph showing a change in the charge voltage until a battery bank unit reaches a final discharge voltage.

In FIG. 4C, the Y axis denotes a charge voltage value of a battery bank unit and the X axis denotes a discharge time. As discharged proceeds, an output voltage of a battery bank unit has an S shape. In other words, the output voltage of a battery bank unit does not show a large voltage drop value in a charge voltage until a certain time point and then rapidly reaches a final discharge voltage after the certain time point.

Referring back to FIG. 2, the method of managing a battery according to the present exemplary embodiment is further described. After finishing the measurement of the initial lifespan characteristic values of all battery bank units 101, 103, 105, and 109 in sequence and the setting of the threshold value of lifespan extensions thereof, the master controller 210 periodically performs full charge and full discharge with respect to each of the battery bank units 101, 103, 105, and 109. The master controller 210 monitors whether a lifespan characteristic value of a specific battery bank unit is gradually decreased from the initial lifespan characteristic value to reach a threshold value of lifespan extension. When the master controller 210 measures the initial lifespan characteristic value or whether a specific battery bank unit reaches the threshold value of lifespan extension, the specific battery bank unit is separately controlled by being separated from the other battery bank units that perform the normal operation of supplying power to the system. In other words, while the other battery bank units perform the normal operation of supplying power to the system, the specific battery bank unit is fully charged through a power source 260 and a rectifying circuit 270 via any one of the DC/DC converters 221, 223, 225, and 229.

Full discharge of the battery bank unit is performed using any one of the DC/DC converters 221, 223, 225, and 229. For example, in a state in which the initial lifespan characteristic values of all battery bank units are stored, the master controller 210 measures whether each battery bank unit reaches the threshold value of lifespan extension. While the battery bank units perform the normal operation of supplying power to the system, the user measures whether the battery bank unit 103 reaches the threshold value of lifespan extension. The battery bank unit 103 is electrically discharged by the DC/DC converter 223. A discharge path is a path connecting a switch SW 250, an inverter 280, and a load 290. As the switch SW 250 is closed, discharge is performed using the inverter 280 and the load 290. This is a mere exemplary embodiment and, for example, discharge may be performed in a method of supplying to another power source in a power system using smart grid application. However, a condition of discharging at a constant current value is needed for discharge as in the measurement of the initial lifespan characteristic value.

If the lifespan characteristic value of the battery bank unit 103 is determined not to reach the threshold value of lifespan extension, compared to the initial lifespan characteristic value, the master controller 210 connects the battery bank unit 103 to another battery bank unit to contribute to the supply of power to the system. Simultaneously or thereafter, the master controller 210 electrically separates the battery bank unit 105 from the battery bank 100, through a switching operation. The DC/DC converter 225 performs a discharge operation. As a result of the measurement, the lifespan characteristic value of the battery bank unit 105 is measured to indicate a value that is equal to or less than the threshold value of lifespan extension. Then, the battery bank unit 105 is identified by the master controller 210 and displayed on a display 230 so that the user may recognize the battery bank unit 105. Since the battery bank 100 recognizes that the battery bank unit 105 needs extension of life, the battery bank unit 105 is electrically separated from the operation of supplying power to the system. Next, the master controller 210 applies a high-frequency current pulse through the DC/DC converter 225 as shown in the waveform diagram 201. When the system removes a material accumulated on the electrode by applying a high-frequency current pulse to the electrode, the efficiency of an electrode may be improved. The master controller 210 performs charge/discharge again through the DC/DC converter 225 and checks whether the lifespan characteristic value of the battery bank unit 105 has been improved.

While desulfation is performed through the application of a current pulse, since the battery bank unit dose not perform its own function of supplying power to the system, a desulfation time may be short. The desulfation of an electrode may be accelerated by changing periodicity and duty of a high-frequency current pulse applied through the DC/DC converter. When the system is operated by changing the periodicity and duty of a high-frequency current pulse applied to the electrode, the frequency of an applied current pulse continuously passes a point that matches a mechanical resonance frequency of the electrode in the battery bank unit and thus a superior effect in removing sulfate may be achieved, compared to the application of a current pulse of a fixed period. Accordingly, when a current pulse is applied to the battery bank unit to desulfate, it is recommended to use the frequency of a current pulse to be as close to the mechanical resonance frequency of an electrode in the battery bank unit. Also, in an environment where it is difficult to identify the mechanical resonance frequency, the system may continuously change the applied current pulse and duty through the DC/DC converter to pass across the mechanical resonance frequency.

In the above-described exemplary embodiments, a total of one hundred and one (101) battery bank units are prepared and one hundred (100) battery bank units are used for the normal operation of supplying power to the system and one (1) battery bank unit undergoes the measurement of a lifespan characteristic value and a life expansion action may be taken if necessary. The user may selectively prepare a sufficiently large number of battery bank units compared to the number of battery bank units for the normal operation, so as to be electrically switched to be connected to the system at any time.

For example, the user prepares one hundred and five (105) battery bank units for a system that requires a total of one hundred (100) battery bank units. The user obtains the initial lifespan characteristic values of all of one hundred and five (105) battery bank units in a method described above and stores the same in the memory of the system. However, among them, four (4) battery bank units are not in use and prepared to be substituted at any time. When one battery bank unit is determined to require a life extension action, the master controller 210 no longer electrically connects the battery bank unit needing the electric pulse application through a switching operation and automatically employing one of the other four battery bank units in preparation as one of the battery bank units constituting the battery bank. When another battery bank unit is determined to require a life extension action during operation of the system, the user employs one of the three substitute battery bank units as one of the battery bank units constituting the battery bank. When one of substitute battery bank units is employed as one of the battery bank units constituting the battery bank, the substitution may be performed automatically or according to a user's event. In other words, the user checks a battery bank unit that requires a life extension action through the display 230 and gives a command "substitution", and then the master controller 210 substitute a substitute battery bank unit as one of the battery bank units constituting the battery bank.

Also, the battery bank unit used in FIG. 2 may be heterogeneous with each other. Since the life of a battery is monitored in real time through a lifespan characteristic value, use of a battery bank unit employing heterogeneous batteries does not raise any issue according to the present exemplary embodiment when the output voltage and current conditions are almost the same between battery bank units. A battery bank unit including batteries of chemically different types may be used because the DC/DC converter that is directly relevant to the charge/discharge of a battery bank unit may independently control a voltage and current.

In an industrial field, a large capacity lead-acid battery bank has been used and a mixed use of the lead-acid battery and a lithium-ion or lithium-polymer battery bank has been practically banned due to a greatly different lifespan therebetween. However, according to the method of managing life of a battery according to the present exemplary embodiment, heterogeneous batteries having different chemical properties may be mixedly used in a battery bank. However, use of homogeneous batteries in a battery bank unit is recommended. When in a lead-acid battery bank a lead-acid battery is replaced with a lithium-ion or lithium-polymer battery, the volume of the lead-acid battery bank may be reduced by ¼. When the method of managing life of a battery bank unit according to the present exemplary embodiment is employed, compatibility of use of a battery bank and space availability may be improved. Moreover, partial replacement of a battery bank unit is possible when necessary and costs needed for an overall system may be reduced.

Figure 5:
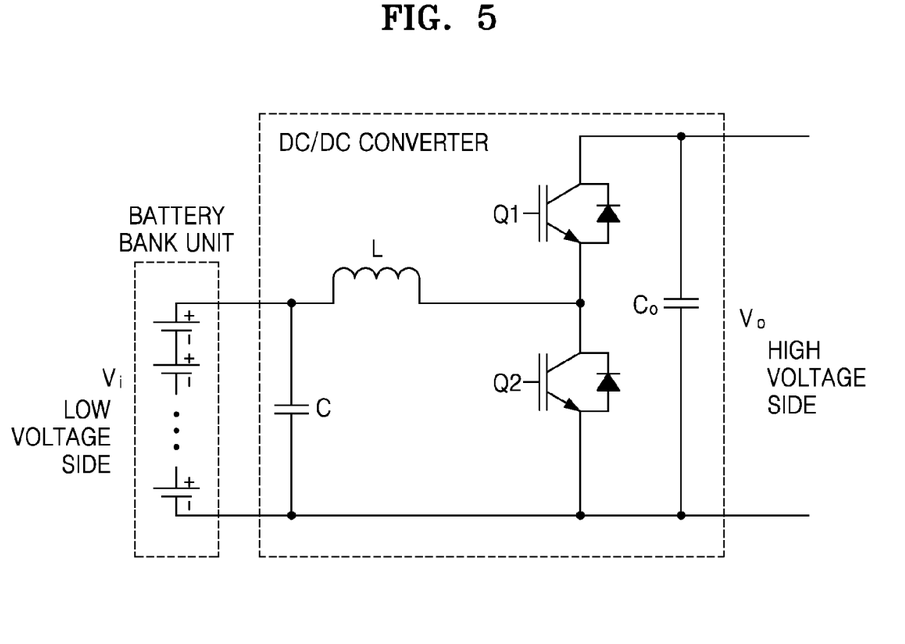
FIG. 5 is a circuit diagram showing an example of a Buck-Boost DC/DC converter according to an exemplary embodiment.

The DC/DC converters 221, 223, 225, and 229 used in FIG. 2 are Buck-Boost DC/DC converters. FIG. 5 illustrates an example of a Boost DC/DC converter circuit according to an exemplary embodiment. The DC/DC converter employed in the present exemplary embodiment controls accurate discharge of a battery bank unit through accurate current control.

A voltage Vi 520 at an input side may correspond to the power source 260 and the rectifying circuit 270 that are connected by the switch SW 250 in FIG. 2. Since the operation of a DC/DC converter is technology that may be easily worked by one of ordinary skill in the art of power electronics technology to which the present inventive concept belongs, a detailed description thereof is omitted. Also, as described above, the DC/DC converter of FIG. 5 is an example of a most simple single-phase DC/DC converter and various Buck-Boost DC/DC converters may be employed according to systems.

Figure 3:
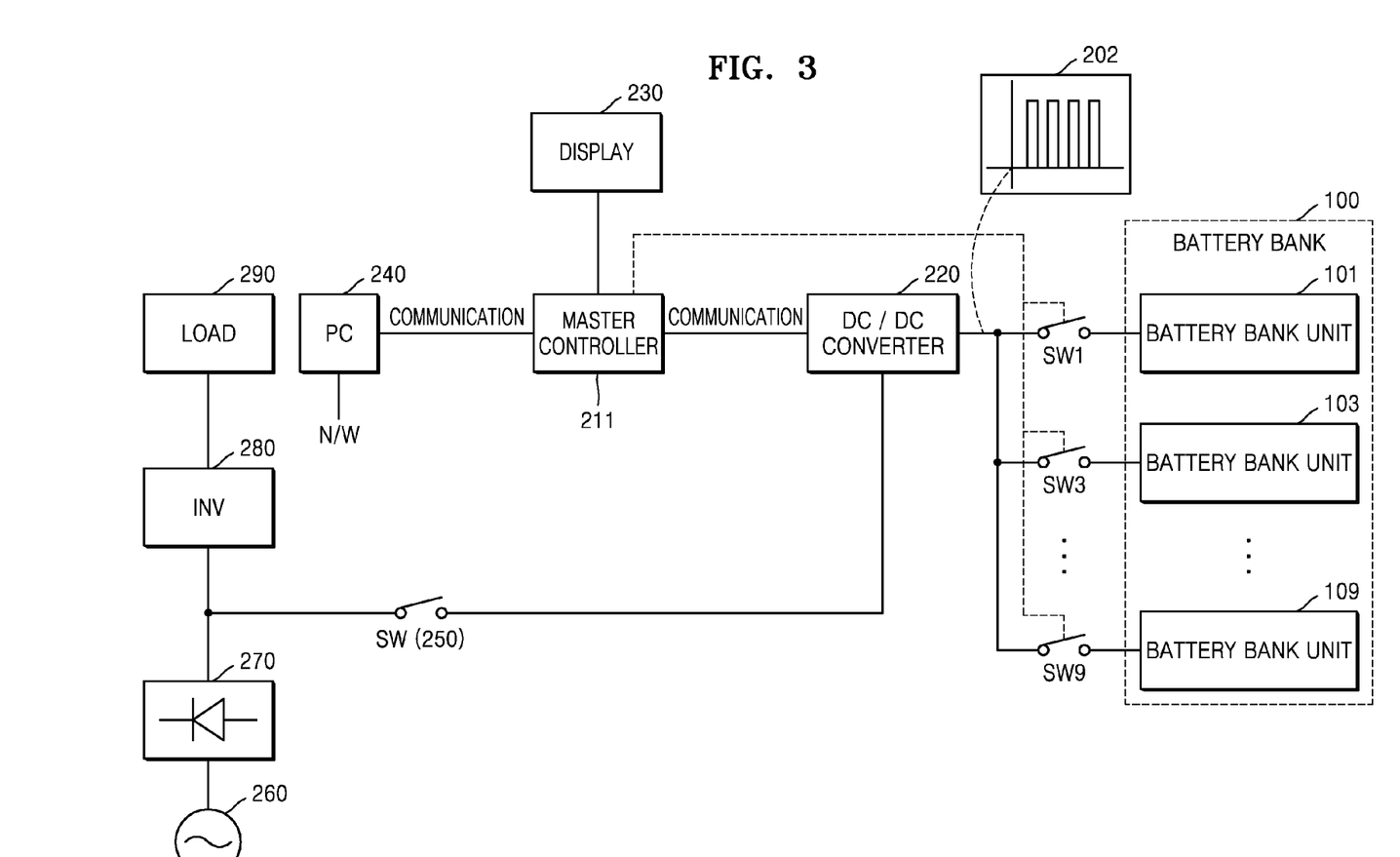
FIG. 3 is a block diagram of an overall system for efficiently managing life of a battery bank, according to another exemplary embodiment.

FIG. 3 is a block diagram of an overall system for efficiently managing life of a battery bank, according to another exemplary embodiment.

In FIG. 2, the DC/DC converters 221, 223, 225, and 229 are respectively connected to the battery bank units 101, 103, 105, and 109. Accordingly, when the number of the battery bank units is 101, one hundred and one (101) DC/DC converters are needed. In FIG. 3, to address the above problem, a single DC/DC converter 220 is used in the system. When the system measures the initial lifespan characteristic value or checks whether the lifespan characteristic value reaches the threshold value of lifespan extension, a full charge/discharge operation of one battery bank unit is performed as a master controller 211 controls each connection between the battery bank unit and the DC/DC converter 220 through a switching operation via a major switch or a changer (dotted line from the master controller 211 to each of the SWs in FIG. 3). For example, when the system determines whether the lifespan characteristic value of the battery bank unit 109 reaches the threshold value of lifespan extension, the master controller 211 closes a switch SW9 to apply a high frequency electric pulse 202 to the battery bank unit 109 and opens other switches SW1 and SW3 by controlling the major switch. The other operations are the same as those described with reference to FIG. 2.

Figure 6:
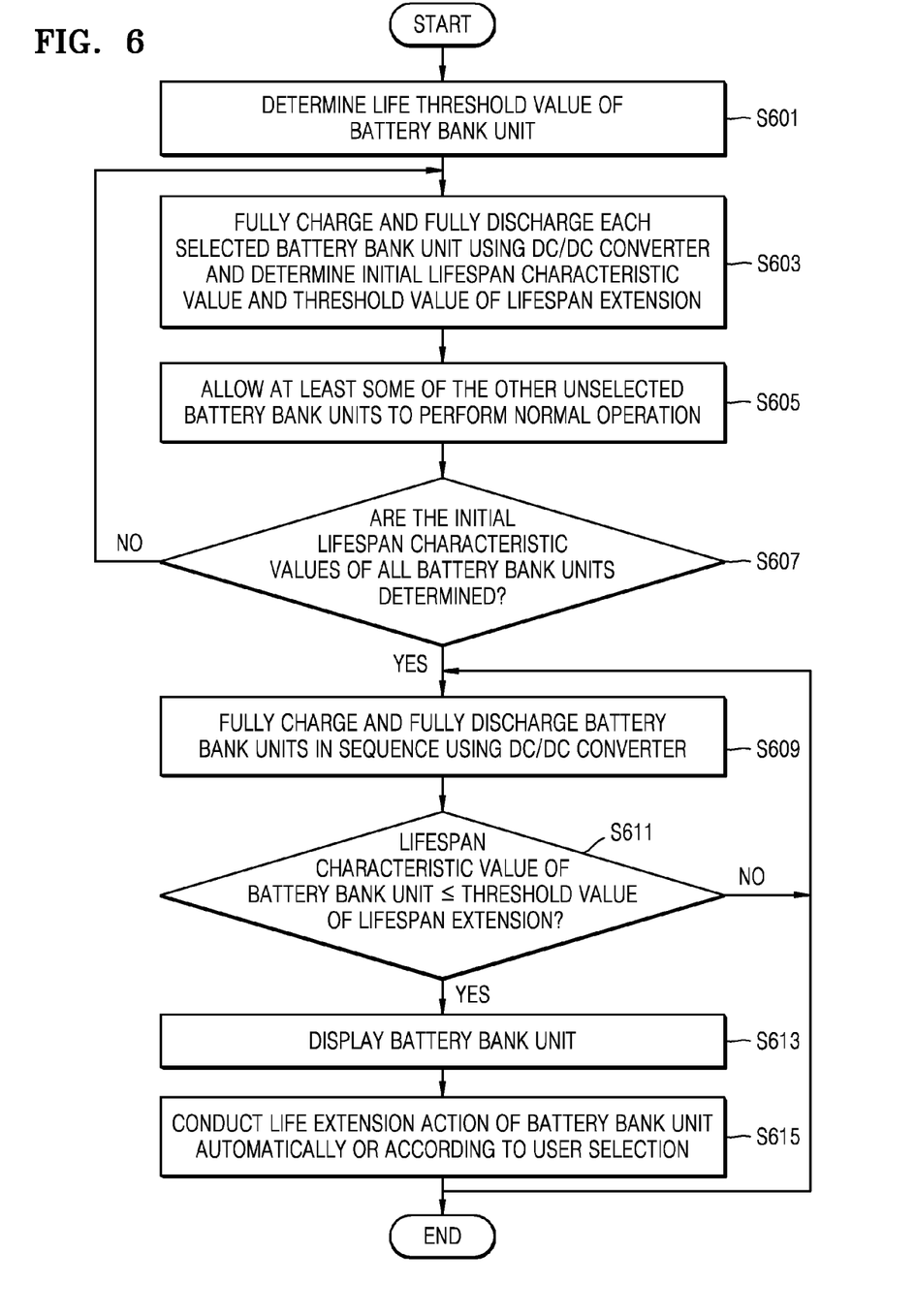
FIG. 6 is a flowchart for explaining a method of efficiently managing life of a battery bank, according to an exemplary embodiment.

FIG. 6 is a flowchart for explaining a method of efficiently managing life of a battery bank, according to an exemplary embodiment.

A master controller determines a life threshold value of each of battery bank units (S601). As described above, the life threshold value may be determined by a predetermined time from full charge to full discharge of a battery bank unit at a constant current or a predetermined energy amount from full charge to full discharge. Alternatively, the life threshold value may be determined by a time taken to approach a predetermined voltage when each battery bank unit is discharged while maintaining a constant current output.

Next, the system selects one of a plurality of battery bank units, fully charges and then fully discharges the battery bank unit through a DC/DC converter, and determines an initial lifespan characteristic value of the selected battery bank unit (S603). The initial lifespan characteristic value and the life threshold value are is of the same kind. In other words, if the initial lifespan characteristic value of a battery bank unit is a time until the battery bank unit is fully discharged after being fully charged, the life threshold value is also a time value. A threshold value of lifespan extension may be appropriately selected between the initial lifespan characteristic value and the life threshold value.

At least some battery bank units of the other battery bank units other than a selected battery bank unit perform a normal operation of supplying power to a system while an initial life property of the selected battery bank unit is determined (S605).

The operations S603 and S605 are repeated until the initial lifespan characteristic value and the threshold value of lifespan extension of all battery bank units are determined (S607).

The battery bank units are sequentially fully charged and fully discharged through the DC/DC converter (S609). It is determined whether the lifespan characteristic value of the battery bank unit reaches the threshold value of lifespan extension through a charge/discharge operation of the DC/DC converter and thus a battery bank unit that requires a life extension action is identified (S611). If the lifespan characteristic value is greater than the threshold value of lifespan extension, the system repeats the operation S609 and measures the lifespan characteristic value of a next battery bank unit.

Otherwise, that is, if the lifespan characteristic value of the battery bank unit is equal to or less than the threshold value of lifespan extension, the master controller determines that the battery bank unit requires a life extension action and displays the identified battery bank unit on a display (S613).

The system automatically replaces the identified battery bank unit that requires a life extension action with a substitute battery bank unit (S615). The automatic replacement of a battery bank unit may be performed according to a user's event, that is, a replacement execution command, after the user recognizes the identified battery bank unit requiring a life extension action that is displayed on the display. The operation S615 is not essential and may be selectively performed by a user or according to the necessity of work.

According to the above-described exemplary embodiments, a user may monitor life of an individual battery bank unit by performing a charge and discharge operation on some of a plurality of battery bank units while supplying stably power to a system with a battery bank including the battery bank units. Furthermore, the user may extend life of a battery bank unit having a short lifespan by applying a DC pulse to the battery bank unit having a short lifespan without having to halt a system operation based on a result of a degree of use of a battery. Accordingly, the user may efficiently manage the life of an overall battery bank by continuously identifying a battery bank unit subject to replacement and taking a life extension action during the system operation.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of managing life of a battery bank, the method comprising:
   determining a threshold value of lifespan extension with respect to a lifespan characteristic value of a battery bank unit;
   selecting one of N-number of battery bank units, charging and discharging the selected battery bank unit through a DC/DC converter;
   determining an initial lifespan characteristic value of the selected battery bank unit;
   repeating the operations of the selecting, charging and discharging, and the determining until the initial lifespan characteristic value of each of the N-number of battery bank units is determined;
   selecting one battery bank unit among the N-number of battery bank units;
   charging and discharging the selected battery bank unit through the DC/DC converter;
   determining a lifespan characteristic value of the selected one battery bank unit;
   identifying the selected one battery bank unit as requiring electric pulses when the lifespan characteristic value of the selected one battery bank unit reaches a threshold value of lifespan extension; and
   applying electric pulses to the identified battery bank unit through the DC/DC converter,
   wherein at least some of (N−1) number of battery bank units other than the selected battery bank unit for the determining of the initial lifespan characteristic value and the selected one battery bank unit for the identifying of the selected one battery bank unit as requiring the electric pulses when the lifespan characteristic value of the selected one battery bank unit reaches the threshold value of lifespan expansion perform a normal operation of supplying power to a system during the steps of the determining of the initial lifespan characteristic value, the selecting of the one battery bank unit among the N-number of battery bank units, the charging and discharging of the selected one battery bank unit, the identifying of the selected one battery bank unit as requiring the electric pulses, and the applying the electric pulses to the identified battery bank unit, and
   wherein the initial lifespan characteristic value is determined by a time to reach a predetermined voltage or full discharge when each of the N-number of battery bank units is discharged while maintaining a constant current output.

2. The method of claim 1, further comprising determining a life threshold value with respect to a lifespan characteristic value of the battery bank unit, wherein the threshold value of lifespan extension is greater than the life threshold value.

3. The method of claim 2, wherein the life threshold value is determined by a predetermined time value that is less than the initial lifespan characteristic value.

4. The method of claim 1, wherein, the identifying of the battery bank unit comprises:

selecting one of the N-number of battery bank units;
fully charging and fully discharging the selected battery bank unit through the DC/DC converter; and
determining whether the lifespan characteristic value of the selected battery bank unit reaches the threshold value of lifespan extension.

5. The method of claim 1, wherein, the applying of an electric pulse through the DC/DC converter comprises applying through the DC/DC converter a continuous electric pulse string.

6. The method of claim 1, wherein, in the applying of an electric pulse through the DC/DC converter, the DC/DC converter applies an electric pulse string at a variable frequency.

7. The method of claim 6, wherein the variable frequency comprises a mechanical resonance frequency of an electrode constituting a battery bank unit to which the electric pulse is applied.

8. An apparatus for managing life of a battery bank, the apparatus comprising:

N-number of battery bank units;
N-number of DC/DC converters respectively connected to the N-number of battery bank units and charging and discharging a battery bank unit; and
a master controller configured to:
select one of the N-number of battery bank units,
control charging and discharging the selected battery bank unit,
determine an initial lifespan characteristic value of the selected battery bank unit;
repeat the operations of the selecting, the controlling, and the determining until the initial lifespan characteristic value of each of the N-number of battery bank units is determined in sequence,
determine a threshold value of lifespan extension with respect to lifespan characteristic values of the N-number of battery bank units, and
select one battery bank unit among the N-number of battery bank units,
determine a lifespan characteristic value of the selected one battery bank unit, and
identify the selected one battery bank unit as requiring electric pulses lifespan characteristic value of the selected one battery bank unit reaches the threshold value of lifespan extension when the DC/DC converter connected to the selected battery bank unit charges and discharges the selected one battery bank unit,
wherein the DC/DC converter applies electric pulses to the identified battery bank unit,
wherein at least some of (N−1) number of battery bank units other than the selected battery bank unit for the determining the initial lifespan characteristic value and the selected one battery bank unit for the identifying the selected one battery bank unit as requiring the electric pulses perform a normal operation of supplying power to a system during the operations of the determining the initial lifespan characteristic value, the selecting the one battery bank unit, the identifying the selected one battery bank unit as requiring the electric pulses, and the applying the electric pulses to the identified battery bank unit, and wherein the master controller determines the initial lifespan characteristic value by a time to reach a predetermined voltage or full discharge when each of the N-number of battery bank units is discharged while maintaining a constant current output.

9. The apparatus of claim 8, wherein the master controller is further configured to determine a life threshold value with respect to a lifespan characteristic value of the battery bank unit, and the threshold value of lifespan extension is greater than the life threshold value.

10. The apparatus of claim 9, wherein the life threshold value is determined by a predetermined time value that is less than the initial lifespan characteristic value.

11. The apparatus of claim 8, wherein the master controller is further configured to identify a battery bank unit whose lifespan characteristic value reaches the threshold value of lifespan extension by selecting one of the N-number of battery bank units and fully charging and fully discharging the selected battery bank unit through the DC/DC converter and determining whether the lifespan characteristic value of the selected battery bank unit reaches the threshold value of lifespan extension.

12. An apparatus for managing life of a battery bank, the apparatus comprising:

N-number of battery bank units;
a switch connected to each of the N-number of battery bank units;
a DC/DC converter discharging the N-number of battery bank units;
a changer connecting a battery bank unit selected to discharge the DC/DC converter and the DC/DC converter via the switch; and
a master controller configured to:
select one of the N-number of battery bank units,
control charging and discharging the selected battery bank unit,
determine an initial lifespan characteristic value of the selected battery bank unit;
repeat the operations of the selecting, the controlling, and the determining until the initial lifespan characteristic value of each of the N-number of battery bank units is determined in sequence,
determine a threshold value of lifespan extension with respect to the lifespan characteristic values of the N-number of battery bank units,
select one battery bank unit among the N-number of battery bank units,
determine a lifespan characteristic value of the selected one battery bank unit, and
identify the selected one battery bank unit as requiring electric pulses when the lifespan characteristic value of the selected one battery bank unit reaches the threshold value of lifespan extension when the selected one battery bank unit is charged and discharged by the DC/DC converter,
wherein the DC/DC converter applies electric pulses to the identified battery bank unit,
wherein at least some of (N−1) number of battery bank units other than the selected battery bank unit for the determining the initial lifespan characteristic value and the selected one battery bank unit for the identifying the selected one battery bank unit as requiring the electric pulses perform a normal operation of supplying power to a system during the operations of the determining the initial lifespan characteristic value, the selecting the one battery bank unit, the identifying the selected one battery bank unit as requiring the electric pulses, and the applying the electric pulses to the identified battery bank unit, and wherein the mater controller determines the initial lifespan characteristic value by a time to reach a predetermined voltage or full discharge when each of the N-number of battery bank units is discharged while maintaining a constant current output.

\* \* \* \* \*